United States Patent [19]
Matsumoto et al.

[11] 3,885,921
[45] May 27, 1975

[54] PREPARING PURIFIED MACROMOLECULAR SOLUBLE PRUSSIAN BLUE

[75] Inventors: Yoshio Matsumoto, Fujisawa; Michiko Shirai, Tokyo; Hiroko Saito, Yokohama; Takeshi Kawashima; Yuzuru Sakabe, both of Tokyo, all of Japan

[73] Assignee: Kitazato Gakuen, Tokyo, Japan

[22] Filed: Feb. 1, 1973

[21] Appl. No.: 328,652

[52] U.S. Cl. .................. 23/300; 23/305; 423/140; 423/184; 423/202; 423/367
[51] Int. Cl. ..................... B01d 21/01; C01c 3/12
[58] Field of Search ............... 23/300, 305, 293 R; 423/367, 140, 150, 184, 202

[56] References Cited
UNITED STATES PATENTS

| | | | |
|---|---|---|---|
| 1,667,839 | 5/1928 | Buchanan | 423/367 |
| 2,005,698 | 6/1935 | Grove | 423/367 |
| 2,415,792 | 2/1947 | Gravell | 423/367 |
| 3,021,191 | 2/1962 | Rhodes | 423/367 |
| 3,094,379 | 6/1963 | Cambi | 423/367 |
| 3,694,149 | 9/1972 | Matsumoto | 23/293 R |

FOREIGN PATENTS OR APPLICATIONS

| | | | |
|---|---|---|---|
| 889,673 | 2/1962 | United Kingdom | 423/367 |

Primary Examiner—Wilbur L. Bascomb, Jr.
Assistant Examiner—S. J. Emery
Attorney, Agent, or Firm—Wenderoth, Lind & Ponack

[57] ABSTRACT

Intensely colored inorganic macromolecular complex compounds or the solution thereof for use in determining the void volume (Vo) of the gel column are provided by a process wherein the crude solution of the so-called Soluble Prussian Blue is purified macromoleculologically, that is, purified to provide the macromolecular substance possessing the desired range of magnitude of molecular size, by means of a salting out procedure.

4 Claims, No Drawings

PREPARING PURIFIED MACROMOLECULAR SOLUBLE PRUSSIAN BLUE

This invention first relates to a method for preparing purified blue-colored inorganic macromolecular complex compounds useful as reagents for determining the void volumes (the volume of external water), Vo, in a gel chromatography column.

Recently, gel chromatography found its roles in the fields of inorganic chemistry and coordination chemistry beside its usual application in the fields of biochemistry and medical chemistry.

In gel chromatography, for example, such as Sephadex column chromatography, it is often necessary to determine either by experimental measurement or by calculation the void volume (the volume of external water), Vo, of the gel column in order to calculate the distribution coefficient of a substance under consideration for internal water to external water of the gel particles, by which coefficient the substance might be characterized and its molecular size or molecular weight estimated.

In calculation of the void volume, Vo, the following relation is used:

$$Vt = Vi + Vo + Vg$$

where, $Vt$ is the volume of the gel column which can be known from the height and diameter of the column; $Vi$ is the volume of internal water (the volume of water contained in the gel particles) which can be easily known; and $Vg$ is volume of the total dry gel used in the column.

Since it is not easy to estimate exactly the value of the last term, Vg, an accurate calculation of the value of Vo in terms of the above equation can not be expected.

Hence it was usual to measure Vo experimentally using an index material which is a macromolecular substance of extremely large particle size, possessed of little attractive interaction with the gel, soluble in water, and visually detectable.

The void volume, Vo, of the gel column is given by direct measurement of the volume of water necessary for an elution of the index substance out of the colummn, column, elution volume of the index substance.

"Blue Dextran 2,000" (commercially available from "Farmacia Co.", molecular weight about 2,000,000) was conventionally used for this purpose.

The Blue Dextran 2,000, however, not only is very expensive but also has an unfavorable character that the blue colored layer of it in the gel column tends to diffuse and expand itself considerably during its descent through the column in the case of elution with water.

When it nearly reaches the depth of the column it should have diffused so much and its color should have become so faded that it becomes difficult to distinguish the location of the layer and to decide the elution volume of it.

On the other hand, it is found that the intensely blue-colored macromolecular metal-complex specified by this invention diffuses very little on the gel column chromatography and thus expansion of the blue layer of the substance in the course of column chromatography on Sephadex was very slight. Since the layer of the blue substance of this invention keeps its narrow thickness, clear-cut outline, and intense blue color until it reaches the bottom of the column, it is possible to measure its elution volume, i.e. the void volume (Vo) of the column, easily and accurately.

The substance of this invention comprising a blue colored inorganic macromolecular complex compound, is produced as a so-called Soluble Prussian Blue and purified macromoleculologically, that is, purified to provide the macromolecular substance possessing the desired range of magnitude of molecular size free from substances of smaller molecular size, by treating the crude solution of it by means of salting out.

So-called Soluble Prussian Blue represented by the chemical formula $KFe^{II}Fe^{III}(CN)_6$, can be prepared by several modes of procedures. It is produced most favorably by mixing any ferric salt with potassium ferrocyanide in the molar ratio of 1 to 1 to react in an aqueous solution.

As an alternative procedure, mixing of any ferrous salt with potassium ferricyanide in the ratio of 1 to 1 to react in an aqueous solution produces the similar complex compound, blue colored, soluble in water, and represented too by the formula $KFe^{II}Fe^{III}(CN)_6$, which can be referred to as the same kind of substance.

Another procedure is to mix any ferrous salt with potassium ferrocyanide in the molar ratio of 1 to 1 in aqueous solution and oxidize the white precipitate thereby produced, $K_2Fe^{II}Fe^{II}(CN)_6$.

In any one of the above mentioned ways, the resulting blue colored reaction solution usually contains substances of various molecular sizes (ranging from the extremely large size of molecule or colloidal particle to the molecule or particle not so large in size) in addition to the reactant substances which remain unreacted and small in molecular size, and thus the reaction mixture in its intact state is not suitable as the index reagent for determining the void volume (Vo) of a gel column. The fact described above can be easily visualized by subjecting to a chromatography on a gel column possessing the function of a molecular sieve, such as Sephadex G-25, G-50, G-75, G-100, G-200, etc. ["Sephadex" is the trade name of a material sold by Pharmacia Co., Uppsala, Sweden, for use in gel chromatography, which is characterized by its function as a molecular sieve. This material is prepared from dextran by cross-linking it together with epichlorhydrin to produce a three dimensional network structure, which is insoluble in but hydrophilic to water. The material swells in aqueous solvents to produce a gel, and the gel particles act as a molecular sieve because of their network structure, limiting the diffusion of solute molecules into them, in accordance with molecular sizes], the blue colored reaction procedures resulting from any one of the formerly mentioned procedures of producing Soluble Prussian Blue. A variety of colored layers corresponding to a variety of molecular or particle sizes is found to separate, e.g. blue layers and yellowish green layers.

In accordance with the method of this invention, the crude aqueous solution of Soluble Prussian Blue, the reaction mixture resulting from any one of the formerly described procedures for producing Soluble Prussian Blue, is mixed with KCl, KBr, $(NH_4)_2SO_4$ or any other electrolyte which is known as useful for "salting out" so as to cause the macromolecular particles to precipitate out of the solution.

The method above described provides a macromoleculologically purified Soluble Prussian Blue suitable for use in determining the void volume of a gel chromatography column. Although the macromolecular complex compound, once precipitated by salting out, often becomes less soluble with duration of time, it can be easily redissolved in water immediately after its precipitation.

The macromoleculologically purified Soluble Prussian Blue obtained herein is about 4 in the value of bog $\epsilon$ (where $\epsilon$ is a molar absorption coefficient per gram atom of iron) and is estimated to have the molecular size (or particle size) corresponding to a molecular weight of about 2,000,000 or more, the estimation being based on the results of its chromatographical separation on Sephadex and ultracentrifugal precipitation. The macromoleculologically purified Soluble Prussian Blue is the most suitable reagent for determining the value Vo of a gel column, since it descends through the column in the form of a sharply bordered thin layer with intense blue color.

The excellent properties of this substance as a Vo determining reagent are demonstrated by comparing it with the conventional reagent, Blue Dextran 2,000, commercially available from Pharmacia Co. in a descending method gel chromatography using Sephadex G-25 or G-100.

The blue colored inorganic macromolecular complex compound produced by the of off this invention, the Soluble Prussian Blue purified macromoleculologically, descends through the gel column with the feature of a sharply bordered, intensely blue colored, thin layer maintained until it reaches the depth of the column, and subsequently makes it easy to determine the elution volume of it, i.e. the void volume (Vo) of the column. On the other hand, Blue Dextran 2,000 diffuses in the gel column and its blue colored layer in the gel column expands itself more and more widely during its descent through the column in the case of elution with water, so that its layer has become widely diffused with an obscure outline when it approaches the bottom.

As a conclusion, it can be stated that the inorganic macromolecular complex compound of this invention is superior to the conventional reagent, Blue Dextran 2,000, as the Vo determining reagent in gel chromatography in the case of elution with water.

EXAMPLE 1

The macromoleculologically purified Soluble Prussian Blue prepared by salting out the reaction solution resulting from a combination of ferric chloride and potassium ferrocyanide with potassium chloride:

Gradual and simultaneous addition of an aqueous solution of ferric chloride consisting of 4.98g (0.018 mole) of ferric chloride $FeCl_3 \cdot 6H_2O$ dissolved in 200 ml of water and an aqueous solution of 8.45g (0.02 mole) of potassium ferrocyanide $K_4Fe(CN)_6 \cdot 3H_2O$ dissolved in 200 ml of water to 400 ml of water with vigorous stirring resulted in an intensely blue colored crude solution of so-called Soluble Prussian Blue.

3 ml of the crude Prussian Blue solution was placed in each of six centrifuge-tubes in which there was added 3 ml of potassium chloride solution of a variety of concentrations, 0.1M, 0.15M, 0.2M, 0.3M, 0.4M, and 0.5M respectively, making the potassium chloride concentration of each of the resulting solutions 0.05M, 0.075M, 0.1M, 0.15M, 0.2M, and 0.25M, respectively. After stirring, the resulting solutions were centrifuged for 5 minutes at 3000 RPM.

The Prussian Blue was completely salted out when its crude solution was mixed with a KCl solution of a concentration equal to or higher than 0.2M, and most of the Prussian Blue was salted out with the 0.15M KCl solution, while with the 0.1M KCl solution, only about a half part of the Prussian Blue was salted out. With any increased amount of 0.1M KCl solution added, the quantity of the Prussian Blue salted out was not distinctly increased.

Then, the yellow colored supernatant liquid in each of the centrifuge-tubes was discarded by decantation and the precipitate was washed with a KCl solution of the same concentration as that used for salting out of the individual precipitates. The tubes were centrifuged again, the supernatant being discarded. The precipitate was washed repeatedly four times by the same process.

The washed precipitate of the Prussian Blue was tested for its value as an index reagent for determining the void volume of the gel column in gel chromatography as follows:

The washed precipitate of the Prussian Blue was dissolved in 10 ml of water and the resulting solution was filtered, though insoluble matter was scarcely found.

0.8 ml of the solution thus prepared, on application to the gel column of Sephadex G-25 as well as Sephadex G-200 (in both cases, 2 cm in diameter and 27 cm in length) with elution by water elution velocity: 98 ml/hr in both cases), descended through the gel column as an intensely blue layer of about 1.5 cm in thickness, which maintained its clear-cut outline substantially without expanding its thickness until it reached the bottom of the column in both cases. The elution volumes of the blue layer were 40 ml and 29 ml respectively for the Sephadex G-25 column and Sephadex G-200 column.

For comparison, chromatographical behavior of commercially available Blue Dextran 2,000 on the same columns was observed. On application of an aqueous solution of commercially available Blue Dextran 2,000 (molecular weight of about 2,000,000) to the same columns (Sephadex G-25 and G-200, respectively) under the same conditions as in the cases of the Soluble Prussian Blue, it was observed in each case that, as to the elution volume measured at the bottom end of the blue colored layer in the descending method of chromatography, the blue layer of the Blue Dextran 2,000 gave the same elution volume as that of the Soluble Prussian Blue prepared by salting out (both reagents showed an elution volume of 40 ml under the above-mentioned conditions with the Sephadex G-25 column and 29 ml with the Sephadex G-200 column).

However, the elution volume, if measured at the medium point of the blue colored layer, increases by a considerable amount for the layer of Blue Dextran 2,000, since the distance between the medium point and the bottom end of the layer is significantly greater in the case of the Blue Dextran, as compared to the corresponding distance in the case of the layer of the Soluble Prussian Blue, so that the elution volume of the latter is substantially identical no matter what part of the layer is chosen as an index point for the determination of the elution volume. Thus, particular excellency of the purified Soluble Prussian Blue as a Vo determining reagent has been illustrated.

EXAMPLE 2

The macromoleculologically purified Soluble Prussian Blue resulting from salting of the reaction solution of ferrous sulfate and potassium ferricyanide with potassium chloride:

Gradual addition with stirring of 100 ml of 0.1M aqueous solution of ferrous sulfate to 100 ml of 0.1M aqueous solution of potassium ferricyanide resulted in a blue colored reaction solution. The resulting blue solution was added to an equivalent volume of KCl solution of the concentrations described in Example 1, the Soluble Prussian Blue being salted out as in example 1.

The precipitate was washed to provide purified Soluble Prussian Blue similarly as in Example 1. The Soluble Prussian Blue, dissolved in distilled water, on applying it to the columns of Sephadex G-25 and G-200 under the same conditions as in Example 1, gave the same result as described in Example 1, illustrating its validity as an index reagent for determining the void volume (Vo) of a Sephadex column in gel chromatography.

EXAMPLE 3

The macromoleculologically purified Soluble Prussian Blue prepared by salting out the reaction solution resulting from a combination of ferric chloride and potassium ferrocyanide with ammonium sulfate:

Ferric chloride solution and potassium ferrocyanide solution were mixed to form the Soluble Prussian Blue in entirely the same way as described in Example 1. 3 ml of the reaction solution was placed in each of five centrifuge-tubes, to which was then added 3 ml of ammonium sulfate solution of the concentrations 0.1M, 0.2M, 0.3M, 0.4M and 0.5M, respectively, making the ammonium sulfate concentration of each resulting solution 0.05M, 0.1M, 0.15M, 0.2M and 0.25M, respectively. After stirring, they were centrifuged for 5 minutes at 3000 RPM.

It was found that the Soluble Prussian Blue was substantially salted out with 0.1M ammonium sulfate solution and completely salted out with ammonium sulfate solution of the concentration 0.2M or greater.

The precipitate formed was washed several times as described in Example 1. The purified precipitate of Soluble Prussian Blue was dissolved in distilled water, and on application to the columns of Sephadex G-25 and G-200 under the same condition as in Example 1, showed entirely the same result as described in Example 1, demonstrating its validity as a Vo determining index reagent applicable in gel chromatography.

We claim:

1. A method of preparing a reagent for determining the void volume of a gel column, which comprises purifying a crude aqueous solution of Soluble Prussian Blue to remove inorganic substances of smaller molecular size from an inorganic macromolecular metal complex compound by admixing a concentrated aqueous solution of a member selected from the group consisting of KCl KBr and $(NH_4)_2SO_4$ with the crude solution, thus causing macromolecular particles of the Soluble Prussian Blue, $KFE^{II}Fe^{III}(CN)_6$, to precipitate out of the crude solution, and separating the precipitated macromolecular particles from the resultant mixture to obtain purified Soluble Prussian Blue.

2. The method according to claim 1, wherein KCl is added to the crude solution.

3. The method according to claim 1, wherein KBr is added to the crude solution.

4. The method according to claim 1, wherein $(NH_4)_2SO_4$ is added to the crude solution.

* * * * *